United States Patent [19]

McRoberts

[11] Patent Number: 4,838,579

[45] Date of Patent: Jun. 13, 1989

[54] METHOD AND APPARATUS FOR DETERMINING MILEAGE

[76] Inventor: Richard C. McRoberts, 9101-68 Steilacoom Rd., SE., Olympia, Wash. 98503

[21] Appl. No.: 251,345

[22] Filed: Sep. 29, 1988

[51] Int. Cl.$^4$ ...................... G09B 19/22; G01D 13/00; G06K 15/00

[52] U.S. Cl. .................................. 283/48.1; 116/302; 235/61 J

[58] Field of Search ............. 283/48; 116/128 R, 302, 116/DIG. 23; 235/61 J

[56] References Cited

U.S. PATENT DOCUMENTS

| | | | |
|---|---|---|---|
| 2,649,709 | 8/1953 | Sturts | 235/61 J |
| 3,314,602 | 4/1967 | Finkelstein | 235/61 J |
| 4,346,665 | 8/1982 | McRoberts | 116/302 |
| 4,347,435 | 8/1982 | Evans et al. | 116/302 |

*Primary Examiner*—Frank T. Yost
*Assistant Examiner*—Paul M. Heyrank, Sr.
*Attorney, Agent, or Firm*—Joan H. Pauly

[57] ABSTRACT

A card (20) has a recording surface (36) with three aligned horizontal rows (40,42,44) of boxes. The first row (40) is in the middle with the second row (42) above it and the third row (44) below it. An initial odometer reading of a vehicle is recorded in the first row (40). At the same time, a base fuel gauge reading is taken and is recorded by positioning a pivotable pointer (50) mounted on the card (20) above the first row (40). The vehicle is driven to consume fuel, and ten gallons of fuel are added to bring the fuel gauge reading above the base reading. When the fuel gauge again reaches the base reading, a second odometer reading is taken and recorded in the second row (42) of boxes. The reading in the first row (40) is subtracted from the reading in the second row (42), and the result is written in the third row (44) of boxes. A decimal point (46) is positioned between the two rightmost boxes of the third row (44) to automatically convert the subtraction results into miles per gallon.

10 Claims, 1 Drawing Sheet

METHOD AND APPARATUS FOR DETERMINING MILEAGE

TECHNICAL FIELD

This invention relates to methods and apparatus for determining the mileage of a vehicle and, more particularly, to such a method and apparatus which minimizes the calculations required and permits the determination to be made without any special equipment installed or attached to the vehicle.

BACKGROUND ART

In recent years, consumers have become aware of the need to conserve fuel so that we will be able to meet our future energy needs. Consumers have also become increasingly aware of the cost savings that can be achieved by increasing the fuel efficiency of vehicles. Both of these concerns have led to an increased interest in determining the mileage that vehicles actually obtain. The conventional method for determining mileage is to divide the number of miles travelled between two occasions of filling the gas tank of the vehicle, by the number or gallons required to fill the tank on the second occasion. This method has the disadvantages of requiring that the tank be filled to capacity on two separate occasions and of involving tedious computations. These disadvantages deter many people from attempting to keep track of the mileage performance of their vehicles.

One approach to solving the problem of the need for an easy way to determine mileage is to provide special meters and/or indicators that are installed in the vehicle. This approach has the obvious disadvantages of relatively high expense and requiring modification of the vehicle.

U.S. Pat. No. 4,346,665, granted Aug. 31, 1982, to the present applicant, discloses a method and apparatus for determining vehicular mileage. The apparatus disclosed therein includes a sight device which is attached to the existing dashboard of a vehicle. The sight device has a portion which aligns with the pointer on the existing fuel gauge and which acts as a reference mark. The method disclosed includes aligning the sight device with the pointer, adding fuel to the tank, and then driving the vehicle until the fuel gauge again aligns with the reference mark. The fuel may be added at the same time the alignment is accomplished before driving the vehicle, or after the vehicle has been driven some distance following the alignment. The odometer is noted at the initial alignment and at the time when the pointer again moves into alignment with the reference mark. The distance travelled between these two occasions and the amount of fuel added provide the data for the calculation of the mileage. In the patent, I disclosed that any quantity of fuel may be added, but the addition of ten units of fuel is preferred since this makes the calculation easier. I also disclosed that a table having one side with distance travelled and the other side with duel units consumed may be used to determine distance travelled per unit of fuel while avoiding mathematical calculations.

The patent cited above and the prior art that is discussed and/or cited therein should be studied for the purpose of putting the present invention into proper perspective relative to the prior art.

DISCLOSURE OF THE INVENTION

A subject of the invention is a device for facilitating calculation of units of distance travelled per unit of fuel consumed by a vehicle of the type having an odometer and a fuel gauge. According to an aspect of the invention, the device comprises a recording surface. The surface includes first, second, and third horizontal rows of boxes. The first row is for receiving a notation of an initial odometer reading. The second row is positioned above and aligned with the first row and is for receiving a notation of a subsequent odometer reading taken following consumption of a predetermined number of units of fuel substantially equal to $10^n$, with n being a whole number greater than zero. The third row is positioned below and aligned with the first and second rows for receiving a notation of the result of subtracting the notation in the first row from the notation in the second row. A decimal point is positioned relative to the third row to automatically convert the result of the subtraction into, and provide a visual display of, units of distance per unit of fuel.

The device preferably further includes a scale with fractional graduations between zero and one, and indicator means. The indicator means is associated with the scale and allows selective recording of the reading of the fuel gauge when the initial odometer reading is taken. The scale and indicator means may take various forms. In the disclosed embodiment, the scale is arcuate, and the indicator means comprises a pivotable pointer.

In its preferred form, the device of the invention comprises a member having a display surface, and a stack of paper mounted on the display surface. The stack includes a plurality of removable sheets of paper. Each sheet has an outer surface with the characteristics of the recording surface described above. The scale and the indicator means are positioned on the display surface adjacent to the stack of paper. This preferred form of the device has the advantages of being relatively simple in structure, inexpensive to manufacture, and easy and fun to use. In addition, the stack of papers allows the device to be used on a number of occasions while automatically providing a permanent record of each mileage determination.

The positioning of the decimal point relative to the third row of boxes is an essential feature of the invention. The desired relative positioning may be achieved by positioning the decimal point on the recording surface between two boxes in the third row. In an alternative embodiment, the decimal point is positioned on the cover of the device, which comprises a folding member. The member has an inner portion that includes the recording surface, and a cover. The cover folds into a closed position in which it substantially covers the recording surface. The cover defines a window through which the result of the subtraction in the third row is visible when the cover is in its closed position. The decimal point is positioned on the outside of the cover adjacent to the window to position it between two boxes in the third row when the cover is closed.

Another subject of the invention is a method for determining units of distance travelled per unit of fuel consumed by a vehicle of the type having an odometer, a fuel tank, and a fuel gauge associated with the tank. According to an aspect of the invention, the method comprises providing a recording surface, such surface including first, second, and third horizontal rows of boxes. The second row is positioned above and aligned with the first row, and the third row is positioned below and aligned with the first and second rows. A decimal point positioned between two boxes in the third row is also provided. The method also comprises taking an initial odometer reading, and substantially simultaneously taking a base fuel gauge reading. The initial odometer reading is recorded in the boxes of the first row. Fuel in the tank is consumed by operating the vehicle. A number of units of fuel are added to the fuel tank, such number being substantially equal to $10^n$, n being a whole number greater than zero, to bring the fuel gauge reading above the base reading. The consumption of fuel is continued, and the fuel gauge is monitored. When the fuel gauge again reaches the base reading, a second odometer reading is taken. The second odometer reading is recorded in the boxes of the second row, and then the initial reading is subtracted from the second reading, and the result is recorded in the boxes of the third row. The decimal point is positioned to automatically convert the result of the subtraction into units of distance per unit of fuel. The method preferably further comprises providing a scale having fractional graduations between zero and one and an indicator associated with the scale, and recording the base fuel gauge reading by positioning the indicator.

In some circumstances, it may be inconvenient or impractical to add as much as ten gallons or other fuel units to the tank. This is particularly likely in the case of a small automobile with a small fuel tank. Therefore, it is a feature of the invention that the step of adding fuel may comprise adding at different times a plurality of quantities of fuel, the sum of the quantities equalling the number of units described above, for example ten units. This optional feature of the invention greatly facilitates the use of the method and apparatus of the invention by drivers of small cars who can easily and conveniently add, for example, five gallons on two separate occasions, but for whom the need to add ten gallons on one occasion would often be impractical.

The method and apparatus of the invention provide a means for greatly simplifying the determination of a vehicle's fuel efficiency. The method and apparatus do not require any special installations in or attachments to the vehicle and reduce the calculations to one simple subtraction. The preferred embodiments of the method and apparatus provide in one simple device and one simple procedure a complete means for recording the necessary data and carrying out the required calculation. The preferred embodiment of the device of the invention provides in one compact simple structure a means for easily recording the fuel gauge level and odometer readings. This frees the operator from any necessity for remembering any of the readings and helps prevent loss of notations of the readings. Since the method and apparatus do not require physical installations or attachments to the vehicle, they may readily be used in conjunction with any type of vehicle having any type of fuel gauge. The invention is versatile and completely compatible with both conventional dial-type fuel gauges and other newer types of gauges, such as bar-type and digital gauges.

These and other advantages and features will become apparent from the detailed description of the best modes for carrying out the invention.

BRIEF DESCRIPTION OF THE DRAWINGS

In the drawings, like element designations refer to like parts throughout, and.

BEST MODES FOR CARRYING OUT THE INVENTION

Figures 1, 2, 3, 4, 5, 6:
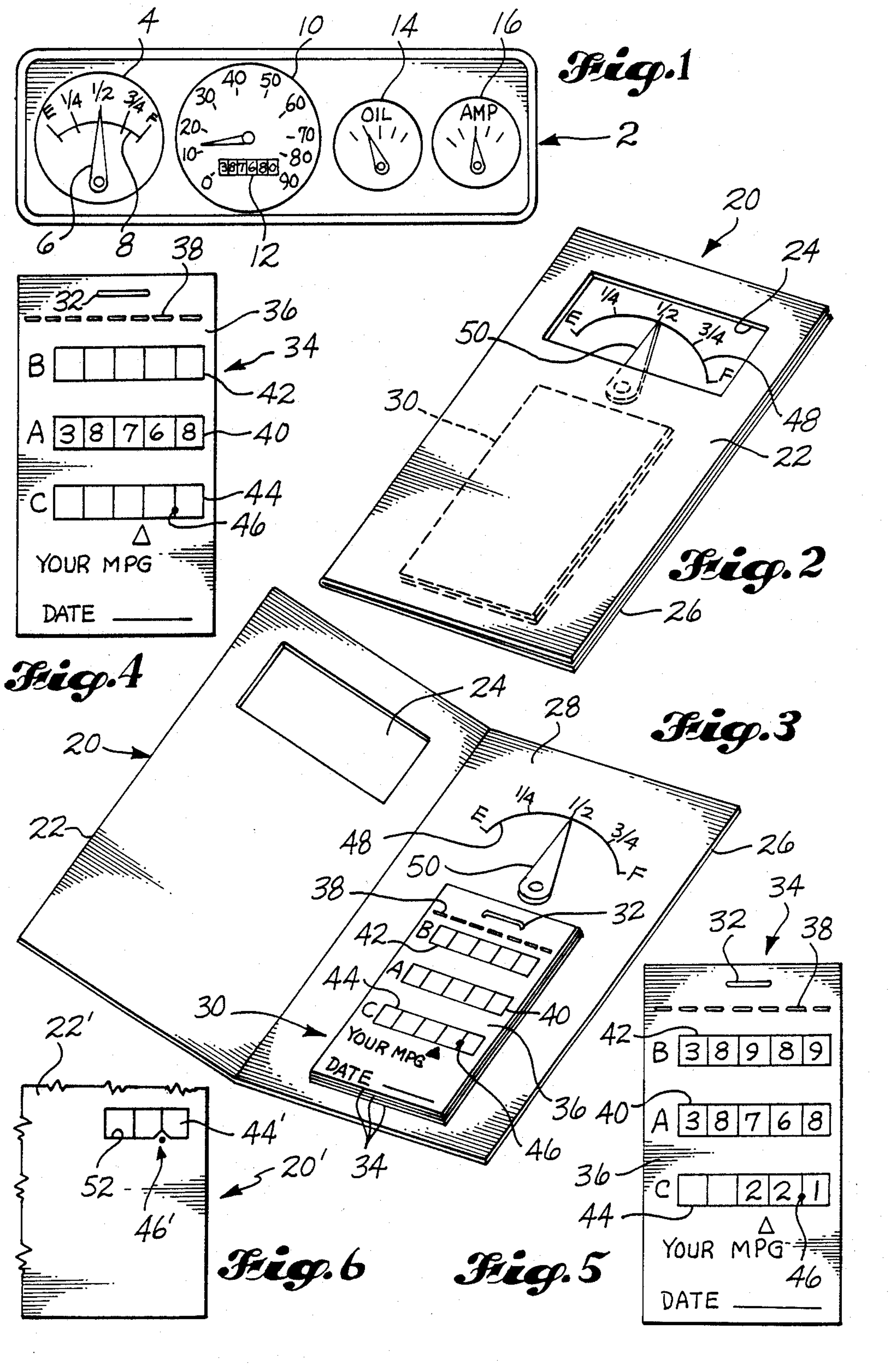
FIG. 1 is an elevational view of a portion of a dashboard of a conventional type, showing conventional dials and gauges.
FIG. 2 is a pictorial view of the preferred embodiment of the invention.
FIG. 3 is a pictorial view of the device shown in FIG. 2 opened and ready for use.
FIG. 4 is an elevational view of the top sheet of paper shown in FIG. 3 with an initial odometer reading recorded thereon.
FIG. 5 is like FIG. 4 except that it also shows a subsequent odometer reading and subtraction results recorded.
FIG. 6 is a fragmentary elevational view of the lower right-hand portion of the cover of a modified form of the device.

The drawings show devices 20,20′ that are constructed according to the invention and that also constitute the best modes of the apparatus of the invention currently known to the applicant. The drawings also illustrate the best mode for carrying out the method of the invention currently known to the applicant. FIG. 1 shows a typical passenger vehicle dashboard configuration. This configuration is shown and described herein for the purposes of illustration. It is of course to be understood that the method and apparatus of the invention may also be used to advantage in connection with passenger vehicles with other types of dashboard configurations and in connection with other types of vehicles.

Referring to FIG. 1, the dashboard 2 has displayed thereon a conventional dial-type fuel gauge 4, an odometer/speedometer 10, an oil pressure gauge 14, and an ammeter 16. The fuel gauge 4 has a scale 8 with the conventional graduations of empty (E), ¼, ½, ¾, and full (F). The gauge 4 also has a pivotable pointer 6 which indicates the fuel level in the vehicle fuel tank in a known manner. The odometer reading on the odometer/speedometer 10 is indicated by the reference numeral 12.

Referring to FIGS. 2 and 3, the preferred embodiment of the apparatus of the invention comprises a folding member or card 20. The card 20 may be made from various materials and is preferably made from lightweight cardboard. The card 20 has a cover 22 and an inner portion or back page 26. The cover 22 has a window 24 formed in its upper portion for the purpose described below. FIG. 2 shows the card 20 closed for storage or transportation. FIG. 3 shows the card 20 opened ready for use.

Referring to FIG. 3, the back page 26 of the card 20 has an inner face which forms a display surface 28. A stack 30 of sheets 34 of paper is attached to the lower portion of the display surface 28 by means of a fastener 32. The fastener 32 may take various forms, such as the large staple 32 shown in FIGS. 3–5. A scale 48 is printed on the display surface 28 above the stack of paper 30. The scale 48 has fractional graduations between zero and one. As shown in FIGS. 2 and 3, the preferred form of the scale 48 is arcuate and the fractional graduations are ¼, ½, and ¾ like the graduations on the conventional fuel gauge 4 shown in FIG. 1. The ends of the scale are preferably marked "E" and "F" to correspond to the markings on the scale 8 on the fuel gauge 4. A pointer 50 is pivotably mounted on the display surfaces 28 below the scale 48, as by a grommet. The pointer 50 is positioned to pivot relative to the scale 48 in the same manner that the pointer 6 of the fuel gauge 4 pivots relative to the fuel gauge scale 8. The attachment of the pointer 50 to the back page 26 is loose enough to allow the pointer 50 to be easily pivoted manually by a user but tight enough to hold its position once it has been pivoted. The scale 48 and pointer 50 are positioned on the display surface 28 to be visible through the window 24 in the cover 22 when the cover 22 is closed, as shown in FIG. 2.

Each of the sheets 34 of paper in the stack 30 has an outer recording surface 36. Each sheet 34 also has a line of perforations 38 so that it may be easily torn off the stack 30 following computation of mileage thereon. After being removed from the stack 30, the sheet 34 may be discarded or retained as a permanent record of the mileage. In order to facilitate the maintenance of a permanent record, a space for recording the date on which the mileage was calculated is provided at the bottom of each sheet 34.

The recording surface 36 of each sheet 34 has three horizontal rows 40,42,44 of boxes printed thereon. The first row 40 is in the middle and is labeled "A" to assist the user in recording the data in the proper places in the right order. The second row 42 is positioned above and aligned with the first row 40. Each of the first and second rows 40,42 is provided for receiving a notation of an odometer reading. Preferably, each of the two rows 40,42 has five boxes for recording the whole number portion of a standard odometer reading. Six, rather than five, boxes may also be provided to include the fractional portion of the odometer reading. The third row 44 is positioned below and aligned with the first and second rows 40,42 and is provided for receiving a notation of the result of subtracting the notation in the first row 40 from the notation in the second row 42. Normally, only three boxes would be required in the third row 44, corresponding to the three rightmost boxes in the first and second rows 40,42. However, in order to improve the appearance of the recording surface 36, the third row 44 has five boxes that are aligned with the five boxes of the first and second rows 40,42. The second row is labeled "B", and the third row is labeled "C" again as an aid to the user in properly recording the data. The boxes in each of the three rows 40,42,44 would usually be square, as shown in the drawings. However, the boxes could also be other shapes, such as rectangular, round, or elliptical.

The card 20 also has a decimal point 46 positioned relative to the third row 44 to automatically convert the result of the subtraction operation into units of distance per unit of fuel. The card 20 and the positioning of the decimal point 46 automatically provide a visual display of the units of distance per unit of fuel. The automatic conversion is accomplished by means of the positioning of the decimal point 46 relative to the recorded difference between two odometer readings taken before and after, respectively, a predetermined number of units of fuel are consumed. The predetermined number of units is substantially equal to $10^n$, with n being a whole number greater than zero. The embodiment of the recording surface 36 is shown in FIGS. 3-5 is intended for use with passenger vehicles and light trucks. The decimal point 46 is positioned on the recording surface 36 between the rightmost and second to rightmost boxes in the third row 44 to correspond to the consumption of ten units of fuel.

An alternative positioning of the decimal point 46' is illustrated in FIG. 6, which shows a modified form 20' of the folding card 20. FIG. 6 shows the lower right-hand portion of the cover 22' of the card 20' in a closed position. This portion of the cover 22' has a small window 52 formed therein through which the right three boxes of the third row 44' are visible when the cover 22' is closed. Rather than being positioned on the recording surface, the decimal 46' is printed on the outside of the cover 22' adjacent to the window 52. As seen in FIG. 6, the decimal point 46' is positioned between the two rightmost boxes of the third row 44' when the cover 22' is closed. The solid portions of the cover 22' around the window 52 cover the remainder of the recording surface.

In each of the two embodiments shown in the drawings, the card 20,20' would preferably also include complete printed instructions on how to use the card 20,20'. In the embodiment of FIG. 6, a legend on the outside of the cover 22' would also preferably be provided to label the mileage showing through the window 52.

The method of the invention will be described in relation to the card 20 shown in FIGS. 2-5. The first step is to take an initial odometer reading when the vehicle is on a substantially level road surface, and to record the reading in the first row 40 of boxes. This is illustrated in FIG. 4. The odometer reading shown recorded in FIG. 4 is the reading that is shown on the odometer/speedometer 10 illustrated in FIG. 1. The fractional portion of the reading, in this case zero, has been deleted. Substantially simultaneously with the taking of the initial odometer reading, a base fuel gauge reading is taken. The fuel gauge reading is recorded on the card 20 by positioning the pivotable pointer 50 to correspond to the position of the pointer 6 of the fuel gauge 4.

After the initial odometer reading and the base fuel gauge reading have been recorded, the vehicle is operated to consume fuel in the tank. Fuel is added to the tank where the tank is sufficiently empty to accept it. As described above, the number of units of fuel added to the tank is substantially equal to $10^n$, with n being a whole number greater than zero. The fuel may be added immediately following the taking of the initial odometer reading and base fuel gauge reading, or after the vehicle has been driven some distance following the taking of these readings. The entire amount of fuel may be added on one occasion. However, if this is impractical because of the size of the tank or for some other reason is not desired, the fuel may also be added at a plurality of different times. The sum of the quantities added at the different times equals the desired number of units. The addition of the fuel brings the fuel gauge reading above the base reading.

After the fuel gauge reading has been brought above the base reading, operation of the vehicle and the consequent fuel consumption are continued. During the operation of the vehicle, the fuel gauge is monitored. When the fuel gauge again reaches the base reading, a second odometer reading is taken. The second odometer reading is recorded in the boxes of the second row 42, as shown in FIG. 5. Then the initial reading is subtracted from the second reading, and the result is recorded in the boxes of the third row 44, also as shown in FIG. 5. The user then merely has to read the third row 44 to determine his mileage.

As noted above, the date of the determination may be recorded at the bottom of the sheet 34 to provide a permanent record of the determination. The mileage determination may be made periodically to enable the vehicle operator to monitor the performance of the vehicle. The periodic determinations can serve to alert the operator when the vehicle is in need of a tune-up or other servicing. More frequent and/or better timed servicing can increase the overall energy savings of the vehicle and also help to prolong the life of the vehicle. In addition, the periodic determinations can alert the driver to poor driving habits that result in decreased mileage, and thereby encourage improvements in driving habits that reduce fuel consumption.

The device 20 shown in FIGS. 2–5 is designed for use in association with passenger vehicles and for computing miles per gallon. It is intended to be understood that the device of the invention may also be adapted for use with large vehicles, such as tractor trailer trucks, which have large fuel tanks capable of holding in excess of a hundred gallons. For use with such large vehicles, the device would be modified to position the decimal point 46 between the second and third boxes from the right in the third row 44. The amount of fuel added in carrying out the method of the invention would be 100, rather than 10, gallons. The method of the invention is also suitable for use in areas where fuel quantities and distances are measured in the metric system. For example, 10 or 100 liters could be added to calculate kilometers per liter.

Since the method and apparatus of the invention are based on readings taken from the vehicle fuel gauge, which indicates fuel level, rather than quantity, there is no need to know what quantity of fuel is contained in the vehicle fuel tank. Therefore, there is no need to fill the tank completely. In personal tests, I have found my method to be very accurate if the fuel gauge and odometer readings are taken when the vehicle is on a substantially level surface. I have found a repeatable correspondence between the fuel level in the tank and the fuel gauge pointer position. Therefore, in the practice of the invention, the amount of fuel consumed between the two odometer readings is essentially equal to the amount of fuel added.

Some newer vehicles are equipped with a computer readout of mileage. The invention is also useful in connection with such vehicles since it provides a means for checking the accuracy of the computer readout and thereby determining whether or not the computer system needs repair. The invention also provides a means for establishing and maintaining a permanent record of the mileage obtained.

The preferred embodiments of the device of my invention and the preferred embodiment of the method of my invention have been described above. The description is in no way intended to limit me to the described embodiments. It is intended to be understood by those skilled in the art that various modifications and omissions in form and detail may be made without departing from the spirit and scope of the invention as defined by the following claims.

What is claimed is:

1. A device for facilitating calculation of units of distance travelled per unit of fuel consumed by a vehicle of the type having an odometer and a fuel gauge, said device comprising:

a recording surface; said surface including a first horizontal row of boxes for receiving a notation of an initial odometer reading, a second horizontal row of boxes positioned above and aligned with said first row for receiving a notation of a subsequent odometer reading taken following consumption of a predetermined number of units of fuel substantially equal to $10^n$, with n being a whole number greater than zero, and a third horizontal row of boxes positioned below and aligned with said first and second rows for receiving a notation of the result of subtracting the notation in said first row from the notation in said second row; and a decimal point positioned relative to said third row to automatically convert said result into, and to provide a visual display of, units of distance per unit of fuel.

2. The device of claim 1, further comprising a scale having fractional graduations between zero and one, and indicator means associated with said scale for selectively recording the reading of the fuel gauge when said initial odometer reading is taken.

3. The device of claim 2, in which said scale is arcuate, and said indicator means comprises a pivotable pointer.

4. The device of claim 2, which comprises a member having a display surface, and a stack of paper mounted on said display surface, said stack including a plurality of removable sheets of paper, each said sheet having an outer surface with the recited characteristics of said recording surface; and in which said scale and said indicator means are positioned on said display surface adjacent to said stack.

5. The device of claim 4, in which said scale is arcuate, and said indicator means comprises a pointer pivotably mounted on said display surface.

6. The device of claim 1, in which said decimal point is positioned on said recording surface between two boxes in said third row.

7. The device of claim 1, which comprises a foldable member with an inner portion which includes said recording surface, and a cover which folds into a closed position in which it substantially covers said recording surface; said cover defining a window through which said result in said third row is visible when said cover is in said closed position; and said decimal point being positioned on the outside of said cover adjacent to said window to position it between two boxes in said third row when said cover is in said closed position.

8. A method for determining units of distance travelled per unit of fuel consumed by a vehicle of the type having an odometer, a fuel tank, and a fuel gauge associated with said tank, comprising the steps of:

providing a recording surface; said surface including a first horizontal row of boxes, a second horizontal row of boxes positioned above and aligned with said first row, and a third horizontal row of boxes positioned below and aligned with said first and second rows; and providing a decimal point positioned between two boxes in said third row;

taking an initial odometer reading, and substantially simultaneously taking a base fuel gauge reading;

recording said initial odometer reading in the boxes of said first row;

consuming fuel in the tank by operating the vehicle;

adding a number of units of fuel to the fuel tank substantially equal to $10^n$, with n being a whole number greater than zero, to bring the fuel gauge reading above said base reading;

continuing to consume said fuel by operating the vehicle, and while so continuing, monitoring the fuel gauge;

when the fuel gauge again reaches said base reading, taking a second odometer reading; and recording said second odometer reading in the boxes of said second row; and then subtracting said initial odometer reading from said second odometer reading, and recording the result in the boxes of said third row;

said step of providing a surface and a decimal point including positioning said decimal point so that, in said third row, a number of boxes equal to the number n are to the right of said decimal point, to automatically convert said result into units of distance per unit of fuel.

9. The method of claim 8, further comprising the steps of providing a scale having fractional graduations between zero and one, and an indicator associated with said scale; and recording said base reading by positioning said indicator.

10. The method of claim 8, in which the step of adding fuel comprises adding at different times a plurality of quantities of fuel, the sum of said quantities equalling said number of units.

* * * * *

UNITED STATES PATENT AND TRADEMARK OFFICE
CERTIFICATE OF CORRECTION

PATENT NO. : 4,838,579

DATED : June 13, 1989

INVENTOR(S) : Richard C. McRoberts

It is certified that error appears in the above-identified patent and that said Letters Patent is hereby corrected as shown below:

On the first page, the Assistant Examiner is -- Paul M. Heyrana, Sr. --, rather than "Paul M. Heyrank, Sr.".

Col. 1, line 47, after "gauge", insert -- pointer --.

Col. 1, line 61, "duel" should be -- fuel --.

Col. 4, line 68, "surfaces" should be -- surface --.

Col. 5, line 63, after "surface 36", delete "is".

Signed and Sealed this

Twenty-ninth Day of May, 1990

*Attest:*

HARRY F. MANBECK, JR.

*Attesting Officer*

*Commissioner of Patents and Trademarks*